(12) United States Patent
Jiang et al.

(10) Patent No.: US 11,162,021 B2
(45) Date of Patent: Nov. 2, 2021

(54) WELLBORE COMPOSITION

(71) Applicant: Hexion Inc., Columbus, OH (US)

(72) Inventors: Li Jiang, Katy, TX (US); Jan Beetge, Pearland, TX (US)

(73) Assignee: Hexion Inc., Columbus, OH (US)

( * ) Notice: Subject to any disclaimer, the term of this patent is extended or adjusted under 35 U.S.C. 154(b) by 233 days.

(21) Appl. No.: 16/012,452

(22) Filed: Jun. 19, 2018

(65) Prior Publication Data

US 2019/0382649 A1  Dec. 19, 2019

(51) Int. Cl.
*C09K 8/72* (2006.01)
*C09K 8/74* (2006.01)

(52) U.S. Cl.
CPC ..................... *C09K 8/74* (2013.01)

(58) Field of Classification Search
CPC .. C09K 3/1012; C09K 17/50; C09K 2101/00; C09K 21/02; C09K 21/12; C09K 3/1409; C09K 8/426; C09K 8/44; C09K 8/487; C09K 8/508; C09K 8/516; C09K 8/74; C09K 8/725; C09K 8/72; C09K 2208/32; C09K 2208/20; E21B 33/138
See application file for complete search history.

(56) References Cited

U.S. PATENT DOCUMENTS

| | | | | |
|---|---|---|---|---|
| 2,485,079 A | * | 10/1949 | Wohnsiedler | C08G 12/38 |
| | | | | 524/598 |
| 3,349,037 A | | 10/1967 | Peterson | |
| 4,157,115 A | * | 6/1979 | Kalfoglou | C09K 8/885 |
| | | | | 166/270.1 |
| 4,926,944 A | | 5/1990 | Schilling | |
| 9,074,125 B1 | * | 7/2015 | Lahalih | C09K 8/512 |
| 2006/0018968 A1 | | 1/2006 | Melbouci | |
| 2015/0053402 A1 | * | 2/2015 | Huey | C09K 8/42 |
| | | | | 166/279 |
| 2015/0240147 A1 | | 8/2015 | Jiang et al. | |
| 2015/0344771 A1 | * | 12/2015 | Jiang | C09K 8/74 |
| | | | | 166/305.1 |

FOREIGN PATENT DOCUMENTS

RU  2017936  *  8/1994

* cited by examiner

*Primary Examiner* — Kumar R Bhushan

(57) ABSTRACT

The embodiments described herein generally relate to methods and chemical compositions for use with wellbore treatment processes. In one embodiment, a composition is provided comprising a mineral acid and a retardation agent selected from the group of an amine containing compound, an amide containing compound, lignosulfonate, and combinations thereof.

20 Claims, 2 Drawing Sheets

WELLBORE COMPOSITION

FIELD OF THE INVENTION

The present invention relates to compositions and products for wellbore treatment processes, in particular, an acid containing composition used in wellbore treatment processes.

BACKGROUND

Hydrocarbon fluids such as oil and natural gas are obtained from a subterranean geologic formation, commonly referred to as a reservoir, by drilling a well that penetrates the hydrocarbon-bearing formation. Once a wellbore is drilled, various forms of well completion components may be installed in order to control and enhance the efficiency of producing the various fluids from the reservoir.

Stimulation operations may be performed to facilitate production of hydrocarbon fluids from subsurface formations by increasing the net permeability of a reservoir. There are two main stimulation techniques: matrix stimulation and fracturing. Matrix stimulation is accomplished, in sandstones, by injecting a treatment fluid (e.g., acid or solvent) to dissolve and/or disperse materials that impair well production. Specifically, matrix stimulation treatment may be performed (1) by injecting chemicals into the wellbore to react with and dissolve the damage and (2) by injecting chemicals through the wellbore and into the formation to react with and dissolve small portions of the formation to create alternative flowpaths for the hydrocarbon (e.g., instead of removing the damage, redirecting the migrating oil around the damage). In carbonate formations, which contains approximately two-third of the world's remaining oil reserves and are intrinsically heterogeneous with complex porosity and permeability profiles, plus irregular flow paths, the goal of matrix stimulation is to create new, unimpaired flow channels from the formation to the wellbore. Matrix stimulation, typically called matrix acidizing when the stimulation fluid is an acid, generally is used to treat the near-wellbore region. In a matrix acidizing treatment, the acid used (for example hydrochloric acid for carbonates) is injected at a pressure low enough to prevent formation fracturing. Fracturing involves injecting chemicals through the wellbore and into the formation at pressures sufficient to actually fracture the formation, thereby creating a large flow channel network through which hydrocarbon can more readily move from the formation and into the wellbore.

One of the problems often encountered in the application of acids, especially mineral acids at elevated reservoir temperatures, is their excessive reaction rate toward carbonate minerals (either calcite ($CaCO_3$) or dolomite $CaMg(CO_3)_2$) originated from a lack of means of modulation to the mobility of the protons. Numerous approaches have been attempted toward retarding the acid reactivity, mainly via physical means. For example, it is common in oilfield operations to encapsulate inorganic acid into shells of polymer gel, linear or crosslinked, or light oils in the presence of surfactant and/or chelating agent. Alternatively, mineral acid is blended into surfactant generating foams shielding acid from the external environment. Also, there are attempts to blend mineral acid with organic acid to modulate its reactivity. Each of these options offers a certain level of performance, but at the same time brings several undesirable side effects.

At present, acid treatments are plagued by two basic limitations namely, limited radial penetration and severe corrosion to pumping and wellbore tubing. Both effects are associated with the higher-than-desired reaction rate (or spending rate) of acid, such as HCl, toward carbonate surface, in particular at higher temperatures. Limitations on radial penetration are caused by the fact that as soon as the acid, in particular mineral acid, is introduced into the formation or wellbore, it reacts instantaneously with the formation matrix and/or the wellbore scaling. In practice, the dissolution is so quick that the injected acid is spent by the time it reaches no more than a few inches beyond the wellbore, incapable of generating much desired fracture length afar from the wellbore. Organic acids (e.g., formic acid, acetic acid and/or lactic acid and its polymeric version) are sometimes used, especially at higher temperatures, to address limitations on radial penetration since organic acids react more slowly than mineral acids. Increasingly, retarded acid systems, which use techniques such as gelling the acid, oil-wetting the formation, or emulsifying the acid with oil, are used. Each of such alternative, however, has associated drawbacks and is an imperfect solution to limited radial penetration.

Thus, an ongoing need exists for improved stimulation operation compositions and methods of utilizing same.

SUMMARY

The embodiments described herein generally relate to methods and chemical compositions for use in wellbore treatment processes. In one embodiment, a composition is provided including a mineral acid and a retardation agent. The composition may further include water.

In one embodiment, a composition is provided comprising a mineral acid and a retardation agent selected from the group of an amine containing compound, an amide containing compound, lignosulfonate, and combinations thereof. The composition may further include water. The amine containing compound or the amide containing compound may have a dipole moment of at least 3 debye.

In another embodiment, a process is provided for using a composition, comprising providing a composition a mineral acid, a retardation agent selected from the group of an amine containing compound, an amide containing compound, lignosulfonate, and combinations thereof, and, optionally, water, and depositing the composition downhole of a wellbore. The composition may be pre-blended with a concentrated mineral acid prior to depositing the composition downhole of a wellbore.

In another embodiment, a process is provided for using a composition, comprising providing a composition a mineral acid, a retardation agent selected from the group of an amine containing compound, an amide containing compound, lignosulfonate, and combinations thereof, and, optionally, water, and blending into an acidizing treatment fluid for the purpose of metal pickling.

The features, functions, and advantages that have been discussed can be achieved independently in various embodiments or may be combined in yet other embodiments, further details of which can be seen with reference to the following description and drawings.

DESCRIPTION OF THE FIGURES

The following is a brief description of figures wherein like numbering indicates like elements.

DETAILED DESCRIPTION

Figure 1:
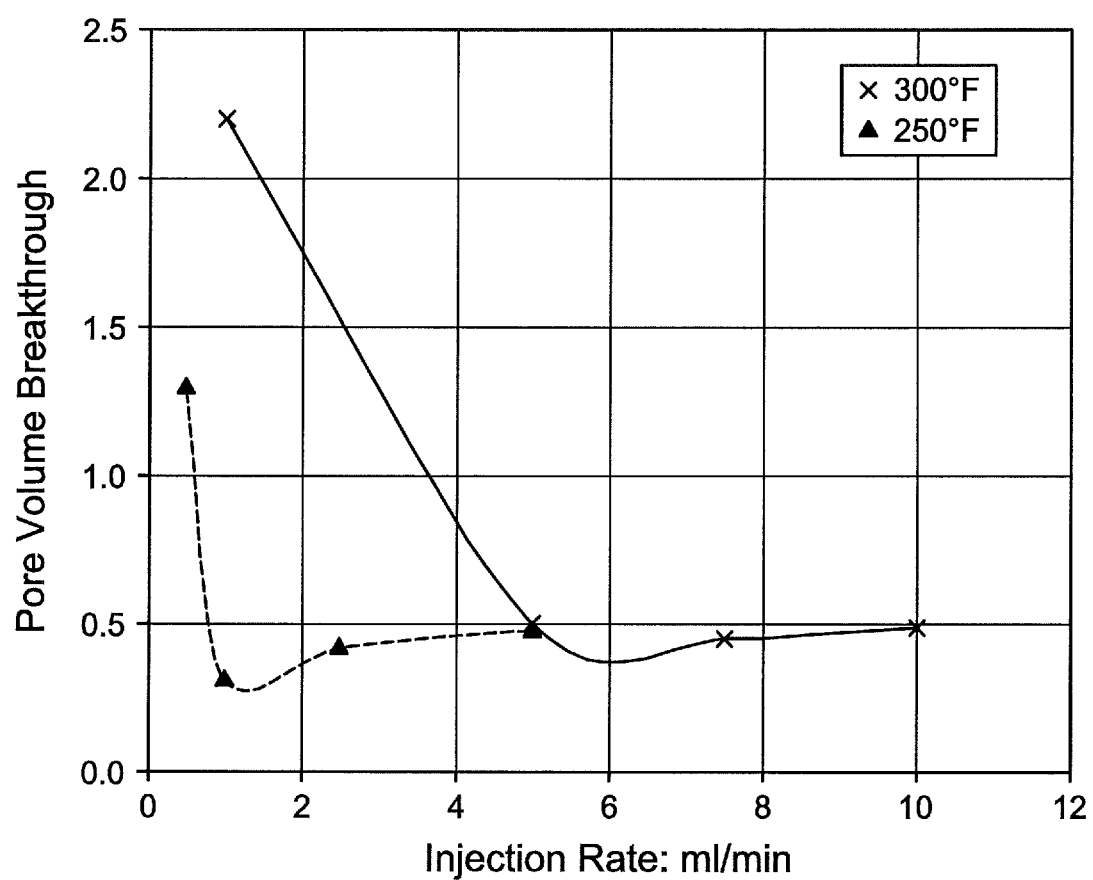
FIG. 1 is a chart disclosing pore volume breakthrough versus injection rate for two sets of experiments were conducted at 250° F. and 300° F. respectively per Table 2.

The embodiments described herein generally relate to methods and chemical compositions for use with wellbore treatment processes.

The term "formation" is defined herein as any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, a monitoring well and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

The term "treatment fluid" is defined herein as any fluid having utility in an oilfield type application, including a gas, oil, geothermal, or injector well. In certain embodiments, a treatment fluid includes any fluid having utility in any formation or wellbore described herein. In certain embodiments, a treatment fluid includes a matrix acidizing fluid, a wellbore cleanup fluid, a pickling fluid, a near wellbore damage cleanup fluid, a surfactant treatment fluid, an unviscosified fracture fluid (e.g. slick water fracture fluid), and/or any other fluid consistent with the fluids otherwise described herein. A treatment fluid may include any type of additive known in the art, which are not listed herein for purposes of clarity of the present description, but which may include at least friction reducers, inhibitors, surfactants and/or wetting agents, fluid diverting agents, particulates, acid retarders (except where otherwise provided herein), organic acids, chelating agents, energizing agents (e.g. $CO_2$ or $N_2$), gas generating agents, solvents, emulsifying agents, flowback control agents, resins, breakers, and/or non-polysaccharide based viscosifying agents.

In one embodiment, a composition is provided comprising an additive composition comprising a mineral acid and a retardation agent. The composition may further include water. The retardation agent may be selected from the group consisting of lignosulfonate, an amine containing compound, an amide containing compound, and combinations thereof. The amine containing compound, the amide containing compound, or both, may have a dipole moment of at least 3 debye. In a further embodiment, the composition may further comprise a viscosity modifier, a corrosion inhibitor, an anti-sludge agent, a chelating agent, an hydrogen sulfide scavenger, or combinations thereof.

The additive composition may be free of phase separation compounds, such as any oily species that would form a separate phase either in macroscopic form or microscopic droplet form from the aqueous fluid.

In one embodiment, the composition may comprise a solid powder. In one embodiment, the composition may comprise an aqueous slurry.

The mineral acid may include one or more compounds selected from the group the mineral acid is selected from the group of hydrochloric acid, nitric acid, phosphoric acid, sulfuric acid, hydrofluoric acid, hydrobromic acid, perchloric acid, hydroiodic acid, and combinations thereof.

In the composition, the mineral acid may comprise from about 0.1% to about 98% by weight (wt. %), such as from about 1% to about 70% by weight (wt. %) or from about 1% to about 37% by weight (wt. %), for example, from about 5 wt. % to about 28 wt.

In embodiments where the mineral acid includes sulfuric acid, the mineral acid may include other sulfonates. Suitable sulfonates include benzene sulfonic acids and the corresponding salts and mono-, di- and tri-alkyl derivatives of benzene sulfonic acids, which can have the formula $C_{10}H_{21}$—$C_{16}H_{33}$, and the corresponding salts. Example of suitable sulfonates include decylbenzene sulfonic acid and its salt, dodecylbenzene sulfonic acid and its salt, tridecylbenzene sulfonic acid and its salt, undecylbenzene sulfonic acid and its salt, and combinations thereof.

The retardation agent may be selected from the group of an amine containing compound, an amide containing compound, lignosulfonate, and combinations thereof. or both, comprises at least an amine containing compound, an amide containing compound, or both, having a dipole moment of at least 3 debye.

Suitable examples of retardation agents include amine-containing resins, asymmetrical amino containing compounds, lignosulfonate, and combinations thereof.

The amine-containing resins include urea-formaldehyde resin, melamine-formaldehyde resins, melamine-urea-formaldehyde resins, derivations thereof, and combinations thereof. The molecular weight range of the amine-containing resins is from 72 to 5000, for examples, a molecular weight range of an urea-formaldehyde resin may be from 90 to 1800, and a molecular weight range of an urea-formaldehyde resin may be from 156 to 3120.

In one embodiment, the amine-containing resin comprises an urea-formaldehyde resin having an urea:formaldehyde ratio from 0.8:1 to 1.2:1. In one embodiment, the amine-containing resin comprises a melamine-urea-formaldehyde resin having a melamine:urea:formaldehyde ratio from 0.1:0.7:1 to 0.2:1.2:1.

In the amine-containing resins having urea, the urea may be a urea alkyl derivative selected from the group consisting of 1,1-dimethylurea, 1,3-dimethylurea, 1,1-diethylurea, 1,3-diethylurea, 1,1-diallylurea, 1,3-diallylurea, 1,1-dipropylurea, 1,3-dipropylurea, 1,1-dibutylurea, 1,3-dibutylurea, 1,1,3,3-tetramethylurea, 1,1,3,3-tetraethylurea, 1,1,3,3-tetrapropylurea, 1,1,3,3-tetrabutylurea, ethyleneurea, propyleneurea, 1,3-dimethylpropyleneurea or 1,3-dimethylethyleneurea, or combinations thereof.

The asymmetrical amino containing compounds may be an asymmetric primary, secondary, tertiary or a quaternary amines. While asymmetry in organic chemistry often refers to chirality, as used herein, this term refers to molecules having an unsymmetrical arrangement of atoms in a molecule, for example a nitrogen atom bonded to different atoms or groups such as diethylmethylamine, which is asymmetric as compared to the symmetric trimethylamine.

One type of asymmetric amine containing compounds that have shown utility in the aqueous composition of the present disclosure are amino acids. Examples of such amines are amino acid, including sarcosine, betaine (such as trimethyl glycine), dimethyl glycine (DMG), iminodiacetic acid (IDA), alanine, asparagine, aspartic acid, cysteine, glutamic acid, histidine, leucine, lysine, methionine, proline, serine, threonine, valine or combinations thereof.

In various embodiments, the amino acid is selected having a molecular weight below 100 g/mol. Additionally, the amino acid may have a molecular weight below 150 g/mol, below 175 g/mol, or greater than these values.

In yet another embodiment, the amine containing compound may be an asymmetric protonated amine, such as, choline chloride.

The lignosulfonate may be lignosulfonate or modified lignosulfonate. As used herein, lignosulfonates are to be understood as aqueous soluble anionic polymers which can be formed as by-products in the sulphite pulping process. Lignosulfonates have generally a wide molecular weight distribution, typically in the range of about 500 to about 200,000. Lignosulfonates may also be referred to as lignosulphonates, lignosulfate, lignin sulfonate, ligninsulfonate, ligninsulfonic acid, lignosulfonic acid or lignosulfuric acid.

The extent of derivation to the lignin starting material may be defined by a degree of sulfonation parameter as depicted in the formula below:

$$SD = \frac{N_{NaOH} \cdot V_{NaOH}}{W_{LS}}$$

Where SD is the degree of sulfonation (mmol/g), $N_{NaOH}$ the mole concentration of the NaOH standard solution (mmol/ml) used in the titration, consumed by a volume of $V_{NaOH}$ (ml), $W_{LS}$ the mass of the lignosulfonate material (g) used to make up the titration solution. The SD is typically estimated by first passing the lignosulfonate solution of known weight concentration through, in sequence, an anion exchange resin column for the purpose of removing residue inorganic acid, and a cation exchange resin column to converting lignosulfonate into corresponding lignosulfonic acid. Then the resultant acidic solution was titrated by a sodium hydroxide standard solution, with the equivalence point being monitored by a potentiometer. The typical SD values are ranging from about 0.2 to about 5.0, such as from about 0.5 to about 4.0, for example, from about 0.8 to about 3.5.

Modified lignosulfonate can be alkalated lignosulfonate. Modified lignosulfonate may include lignosulfonates reacted with a base or salt, such as sodium hydroxide. Modified lignosulfonates may include cations selected from the group consisting of ammonium cations, lithium cations, sodium cations, potassium cations, silver cations, calcium cations, magnesium cations, zinc cations, iron cations, copper cations, cobalt cations, manganese cations, nickel cations, titanium cations, aluminum cations, or combinations thereof. An example of a modified lignosulfonate is sodium lignosulfonate, which may be referred to as NBS. Modified lignosulfonates, and derivatives of lignosulfonates, are known in the art.

In the composition, the retardation agent may comprise from about 0.1% to about 98% by weight (wt. %), such as from about 1% to about 70% by weight (wt. %) or about 1% to about 30% by weight (wt. %), for example, from about 5 wt. % to about 25 wt. % of the composition. In one embodiment, when the retardation agent comprises the amine containing compound, the amide containing compound, or both, the retardation agent may be from about 0.1 wt % to about 20 wt %, such as from about 0.25 wt % to about 15 wt %, for example, from about 0.5 wt % to about 10 wt % of the composition. This amount is separate from any lignosulfonate that may in the composition.

In one embodiment, the retardation agent may also have a high dielectric constant, E. Specifically, amine or amide containing molecules having the molecular weight herein react with a mineral acid such as hydrochloric acid, with the formation of an adduct that has a dipole moment of at least 3. Without being bound by theory, the inventors of the present application believe that the retardation effect exhibited by the retardation agent species is due to the molecular interactions occurring between the nitrogen atoms in the amine or amide containing compound and the acidic proton in the mineral acid with the formation of an adduct that exhibits a high dipole moment Other retardation agent used in the composition may be selected from the group consisting of chelating ligands, acid internal phase emulsions, surfactants, and combinations thereof.

In one embodiment, when the retardation agent comprises the amine containing compound, the amide containing compound, or both, the retardation agent and the mineral acid may be present in a molar ratio from about 0.1 to about 9, such as from about 0.1 to about 2 or from about 0.1 to about 1.8, for example, from about 0.2 to about 1.5. However, the invention contemplates that the ratio can be outside the cited ranges as the selection of a molar ratio depends upon the specific embodiment of the ratio compounds.

The composition may further include a viscosity modifier, a corrosion inhibitor, an anti-sludge agent, a chelating agent, a hydrogen sulfide scavenger, and combinations thereof.

The composition may further include a viscosity modifier. The viscosity modifier may comprise a polyol. Suitable polyols include clay minerals, polysaccharide, and combinations thereof. Examples of suitable clay minerals are selected from the group consisting of kaolinite, illite, chlorite, smectite, attapulgite, sepiolite, montmorillonite, and combinations thereof. Suitable polysaccharides include a polysaccharide of a general formula of $C_X(H_2O)_Y$, where X is usually a large number between 200 and 2500 and Y is 20. In polysaccharides having repeating units in the polymer backbone of six-carbon monosaccharides, the general formula simplifies to $(C_6H_{10}O_5)_n$, where n ranges from 40 to 3000. Examples of suitable polysaccharide includes starch, amylose, amylopectin, cellulose, chitin, callose, laminarin, chrysolaminarin, xylan, arabinoxylan, mannan, fucoidan, galactomannan, and combinations thereof.

In the composition, the viscosity modifier comprises from about 0.01% to about 20% by weight (wt. %), such as from about 0.5 wt. % to about 15 wt. %, for example, from about 1.0 wt. % to about 10 wt. % of the composition.

The composition may further include a corrosion inhibitor. Suitable corrosion inhibitors include compounds having functional groups selected from the group consisting of alcohol, ketone, quaternary amine and combinations thereof. Examples of suitable corrosion inhibitors include acetylene alcohol, such as oxtynol of a generic formula $CH_3$—$(CH_2)_x$—CH(OH)—C≡CH where x=4-18, 2-benzoylallyl alcohol, 2-benzoyl-3-methoxy-1-propene, 2-benzoyl-1,3-dimethoxy-propane, 5-benzoyl-1,3-dioxane, 4-hexyrescorinol, 2,6-di-t-butyl-methylphonel, epinephrine, tyrosine, serotonin, urushiol, vanillin, methylsalicylate, phenylvinylketone (and the corresponding oligomer and/or polymer), didecyl dimethyl ammonium chloride, glycine betaine, diethyl ester dimethyl ammonium chloride, distearyldimethylammonium chloride, benzalkonium chloride, benzethonium chloride, methylbenzethonium chloride, cetalkonium chloride, cetylpyridinium chloride, hexadecyltrimethylammonium bromide, dofanium chloride, tetraethylammonium bromide, didecyldimethylammonium chloride and domiphen bromide and combinations thereof. If used in the composition, determined by the nature of the hydrocarbon resource to be produced and the treatment design requirement, the corrosion inhibitor comprises from about 0.1 wt. % to about 8 wt. %, such as from about 0.25 wt. % to about 5 wt. %, for example, from about 0.5 wt. % to about 2 wt. % of the composition.

The composition may further include an anti-sludge agent. In the process of acidizing operations, asphaltene and/or wax/paraffin components contained in, particularly heavier, end of crude oil tend to precipitate out of the crude oil phase to block the existing and newly formed passageways in the formation and reduce the efficacy of the acidizing treatment. Suitable anti-sludge agents include mono-, di- and tri-alkyl derivatives of benzene sulfonic acids, with a general formula $C_{10}H_{21}$—$C_{16}H_{33}$, and the corresponding salts. Example of suitable sulfonates include decylbenzene sulfonic acid and its salt, dodecylbenzene sulfonic acid and its salt, tridecylbenzene sulfonic acid and its salt, undecylbenzene sulfonic acid and its salt, and combinations thereof. Another group of anti-sludge include quaternary ammonium compound, for example include but not limited to didecyl dimethyl ammonium chloride, glycine betaine, diethyl ester dimethyl ammonium chloride, distearyldimethylammonium chloride, benzalkonium chloride, benzethonium chloride, methylbenzethonium chloride, cetalkonium chloride, cetylpyridinium chloride, hexadecyltrimethylammonium bromide, dofanium chloride, tetraethylammonium bromide, didecyldimethylammonium chloride and domiphen bromide and combinations thereof. If used in the composition, the anti-sludge agent comprises from about 0.1 wt. % to about 5% wt. %, such as from about 0.3 wt. % to about 3 wt. %, for example, from about 0.5 wt. % to about 2 wt. % of the composition.

The composition may further include a chelating agent. The chelating agent can complex with ions (e.g., di- or tri-valent cations) during the acidizing treatment, such as cations formed or released from the subterranean formation during the acidizing job thereof. The chelating agent can be any suitable chelating compound that can prevent or reduce formation and precipitation of compounds from dissolved ions during acidizing of a subterranean formation. Suitable chelating agents include polycarboxylic acid, polyaminopolycarboxylic acid, monoaminopolycarboxylic acid, and combinations thereof. Examples of chelating agents include ethylenediaminetetracetic acid (EDTA), N-(2-hydroxyethyl) ethylenediaminetriacetic acid (HEDTA), glutamic acid N,N-diacetic acid (GLDA), methyl-glycine-N,N-diacetic acid (MGDA), hydroxyiminodisuccinic acid (HIDS), .beta.-alanine diacetic acid, S,S-ethylenediaminedisuccinic acid, diethylenetriaminepentaacetic acid (DTPA), nitrilotriacetic acid (NTA), ethyleneglycoltetraacetic acid (EGTA), 1,2-bis (aminophenoxy) ethane-N,N,N',N'-tetraacetic acid (BAPTA), cyclohexanediaminetetraacetic acid (CDTA), triethylenetetraaminehexaacetic acid (TTHA), N-hydroxyethylaminodiacetic acid, 2-hydroxyethyliminodiacetic acid, malic acid, tartaric acid, citric acid, and a salt of any one of the preceding, and combinations thereof (specific chemical names) If used in the composition, the chelating agent comprises from about 0.01 wt. % to about 10 wt. %, such as from about 0.1 wt. % to about 5 wt. % of the composition.

The composition may further include a hydrogen sulfide scavenger. In the course of acidizing treatment, it is desirable to reduce, if not eliminate, the effect of $H_2S$ gas contained in crude oil or natural gas. Suitable hydrogen sulfide scavengers include an aldehyde-based organic compound, a chelating agent, a metal carbonate, a metal hydroxide, a metal oxide, or combinations thereof. Examples of hydrogen sulfide scavengers include formaldehyde, glutaraldehyde, glyoxal, acrolein, triazine, ammonium, sodium, and potassium salts of ethylenediaminetetraacetic acid, copper carbonate, zinc hydroxide, zinc oxide, zinc naphthenate, iron oxide (in particular magnetite $Fe_3O_4$), ferrous gluconate, hydrogen peroxide, ammonium bisulfite, and combinations thereof. If used in the composition, the hydrogen sulfide scavenger dosage depends on the $H_2S$ concentration and specific treatment design requirement, typically comprises from about 0.05 wt. % to about 5% wt. %, such as from about 0.1 wt. % to about 4 wt. %, for example, from about 0.25 wt. % to about 3 wt. % of the composition.

The composition may also include a solvent, such as water. The solvent may be from about 37% to about 95% by weight (wt. %), such as from about 40 wt. % to about 90 wt. %, for example from about 50 wt. % to about 85 wt. % of the composition.

Some non-limiting embodiments of the composition described herein are as follows.

In one embodiment of the composition, the composition comprises:
from about 0.01 to about 33 wt % mineral acid;
from about 0.01 to about 25.0 wt % retardation agent; and
from about 42 to about 99.98 wt % water, wherein the amount of the components totals 100 wt. %.

In another embodiment of the composition, the composition comprises:
from 5.0 to 28 wt % hydrochloric acid;
from 0.01 to 5.0 wt % sulfuric acid;
from 0.01 to 5.0 wt % urea-formaldehyde, urea-formaldehyde derivative, or both;
from 0.01 to 20 wt % lignosulfonate; and
from 42 to 94.97 wt % water, wherein the amount of the components totals 100 wt. %.

In another embodiment of the composition, the composition comprises:
from about 0.01 to about 33 wt % mineral acid;
from about 0.01 to about 25.0 wt % retardation agent;
from about 0.01 to about 5.0 wt % viscosity modifier, a corrosion inhibitor, an anti-sludge agent, a chelating agent, a hydrogen sulfide scavenger, and combinations thereof; and
from about 37 to about 99.97 wt % water, wherein the amount of the components totals 100 wt. %.

In another embodiment, such a composition comprises:
from about 5.0 to about 28 wt % hydrochloric acid;
from about 0.01 to about 5.0 wt % sulfuric acid;
from about 0.01 to about 5.0 wt % urea-formaldehyde, urea-formaldehyde derivative, or both;
from about 0.01 to about 20 wt % lignosulfonate;
from about 0.01 to about 5.0 wt % viscosity modifier, a corrosion inhibitor, an anti-sludge agent, a chelating agent, a hydrogen sulfide scavenger, and combinations thereof; and
from about 37 to about 94.96 wt % water, wherein the amount of the components totals 100 wt. %.

In another embodiment, such a composition comprises:
from 5.0 to 28 wt % hydrochloric acid;
from 0.01 to 5.0 wt % urea-formaldehyde, urea-formaldehyde derivative, or both;
from 0.01 to 20 wt % lignosulfonate;
from 0.01 to 5.0 wt % viscosity modifier; and
from 42 to 94.97 wt % water, wherein the amount of the components totals 100 wt. %.

In another embodiment, such a composition comprises:
from 5.0 to 28 wt % hydrochloric acid;
from 0.01 to 5.0 wt % sulfuric acid;
from 0.01 to 20 wt % lignosulfonate;

from 0.01 to 5.0 wt % viscosity modifier; and from 42 to 94.97 wt % water, wherein the amount of the components totals 100 wt. %.

In one embodiment, the composition described herein is pumped downhole of a wellbore for a reservoir treatments. Examples of reservoir treatments include spearheading, matrix acidizing, and fracture acidizing, among others. In one embodiment of a process for using a composition, the process includes providing the composition described herein and depositing the composition downhole of a wellbore. In one embodiment for downhole use, the composition may be pre-blended with a mineral acid in an acid tank, a transportation vessel, a downhole flow line, or a combination thereof. The mineral acid may be selected from the group of hydrochloric acid, sulfuric acid, nitric acid, fluoric acid, phosphoric acid, and combinations thereof. When the bulk acid and composition are pre-blended, the bulk acid comprises from about 5 wt. % to about 30 wt. % of the blend. The mineral acid may be a concentrated mineral acid having a molar concentration range from about 1 M (mol/L) about 8 M.

In one embodiment, the composition described herein is used for metal pickling. In one embodiment of a process for using a composition, the process includes providing the composition described herein and blending into an acidizing treatment fluid for the purpose of metal pickling. Metal surfaces, including carbon steel, ferrous metal and alloys, coming out of the steelmaking, high temperature treatment such as welding, processes often contain impurities, including films of scale and oxide, that have to be removed prior to subsequent use. Mineral acids including hydrochloric, sulfuric, nitric and phosphoric acids are commonly applicable to the operations. Such mineral acid based pickling compositions including passivation provision serve to improve the resistance of the metallic component against conditions of the environment in which the components are exposed. In one embodiment, the metal piece to be treated is passed through a pickling bath of up to 200° F. with pre-determined acid strength for a period of time. At the end of the process, the scale and/or oxide film would have been removed. However, pickling treatment using un-retarded mineral acid often result in pitting corrosion on the metal due to too-rapid reaction rate. Therefore, the capability of modulating the reaction rate at elevated treatment temperatures is highly desirable for quality control purpose In one embodiment, the composition described herein is used for suppression of mineral acid vapor fume in the gas phase, hence benefitting mineral acid storage, transportation and handling. Mineral acids such as hydrochloric acid have finite solubility in water solvent. The finite water solubility of raw mineral acids, in particular at higher concentrations, invariably results in abundant gas phase presence that often carries characteristic pungent smell, that poses a routine concern of safety and health. For example, hydrochloric acid of 10 wt % and above would exhibit an unmistakably strong and penetrating smell. As such it becomes a serious concern in the processes of its use, storage, transportation and emergency handling. The modification composition disclosed in this invention circumvents this undesirable problem by exerting stronger bind to the acidic proton, hence substantially enhanced miscibility in the aqueous phase that, in turn, significantly reduced (if not totally eliminated) the presence of the harmful acid in the gas phase.

In one embodiment, the composition of the cementitious materials and additive composition is an oil/gas well drilling fluid composition. In one embodiment, the composition of the cementitious materials and additive composition is an oil/gas well fracturing fluid composition. In one embodiment, the composition of the cementitious materials and additive composition is a hydrothermal well drilling fluid composition.

The inventors believe that the compositions described herein may be used in high temperature (from 65° C. to 177° C.) reservoir stimulation treatment, where its reduced reactivity towards the wellbore composition, such as carbonate, renders deeper penetration into the formation resulting in highly desirable prolonged conductive network. In addition, the compositions also demonstrates significant savings in the quantity of acid agent, and that of corrosion inhibitors, in comparison to conventional acid under otherwise identical treatment conditions, needed to generate the necessary conductive network

EXAMPLES

Aspects and advantages of the embodiments described herein are further illustrated by the following examples. The particular materials and amounts thereof, as well as other conditions and details, recited in these examples should not be used to limit the embodiments described herein. All parts and percentages are by weight unless otherwise indicated.

Example 1: Retardation Factor at Ambient Temperature

The unity of retardation factor was defined as the time in seconds that takes a droplet (approx. 0.5 ml) of 15 wt % HCl to complete its reaction with pure calcium carbonate surface. It was recorded as shown by the development of carbonate dioxide bubbles (polished Indiana Limestone rock block, permeability 2-4 mD, acquired from Kocurek Industries, Caldwell, Tex., sourced from western Texas site). For other retarded HCl solutions of equal effective acid concentration, retardation factor is designated as the ratio of time takes to compete the reaction in comparison to un-retarded raw acid. A retardation factor of 1 means the reaction has no retardation.

The retardation factor is determined by placing a droplet of approximately 0.5 ml acidic fluid of identical concentration, retarded or otherwise, on the surface of the limestone specimen and monitoring the reaction process until the acidic fluid is completely depleted. The time used by the raw acidic fluid (control sample) to deplete is normalized as one, and the time used by other acidic fluids with different levels retardation to deplete against the control sample is taken as their respective retardation factor.

Table 1 illustrates the retardation factor for a control and a series of compositions having varying amounts of lignosulfonate (LS). MUF represent a melamine-urea-formaldehyde resin of 10:45:45 ratio. HCl is hydrochloric acid.

TABLE 1

| Components | Control Sample | Sample 1 | Sample 2 | Sample 3 | Sample 4 | Sample 5 | Sample 6 |
|---|---|---|---|---|---|---|---|
| LS (wt. %) | 0 | 14 | 10 | 6 | 2 | 2 | 2 |
| MUF (wt. %) | 0 | 1 | 1 | 1 | 1 | 2.5 | 5.0 |

TABLE 1-continued

| Components | Control Sample | Sample 1 | Sample 2 | Sample 3 | Sample 4 | Sample 5 | Sample 6 |
|---|---|---|---|---|---|---|---|
| HCl (wt. %) | 15 | 15 | 15 | 15 | 15 | 15 | 15 |
| Water (wt. %) | 85 | 70 | 74 | 78 | 82 | 80.5 | 78 |
| Retardation Factor | 1 | 24 | 16 | 9.3 | 8 | 9 | 12 |

Table 1 discloses the dependency of retardation factor on the loading levels of modification composition. The series of tests show that the retardation effect at ambient temperature originates from the combined effect of the two retarding additives.

Example 2: Thermal Stability Test

A high-temperature-high pressure (HTHP) autoclave at above 300° F. level for 3 hours was coupled to prior and post heating base-acid titration to determine the HCl concentration. Multiple compositions were subject to an environment of up to 350° F. mark, under 1000 psi static pressure of nitrogen, for a period of 180 minutes in an autoclave. An unlimited example of the composition used is:

15 wt % hydrochloric acid (diluted from 36 wt % hydrochloric acid stock solution),
5 wt % melamine-urea-formaldehyde resin,
2 wt. % gluconate (an amino acid),
12% wt. % lignosulfonate,
2 wt. % glycerol (a polyol), and
64 wt. % de-ionized water.

A standard solution of sodium hydroxide was prepared freshly by dissolving 0.451 g anhydrous sodium hydroxide pellets (Sigma-Aldrich) in 8.990 g di-water, resulting in a concentration of 0.194 mol/L. The solution was titrated dropwise against 2.000 g retarded hydrochloric acid solution in the presence of a magnetic stir bar and monitored by a potentiometric probe. The endpoint of the titration was taken at pH 7.0±0.5.

It was determined that properly formulated compositions preserved in essence the exact acid capacity as a result of the exhaustive heating process. The example shows that the modified acid preserves 100% its acid capacity under elevated temperature for a period of time without any thermal-induced degradation. The chemical compatibility between the additives and the acid forms the quantitative foundation of plural applications of the compositions in conditions of elevated temperatures.

Example 3: HPHT Matrix Acidizing Test

Matrix acidizing has long been used for permeability and productivity enhancement purposes in oil and gas wells. Successful matrix acidizing of carbonate reservoirs depends significantly on the selected acid or acid mixtures. HCl has been used for a long time in carbonate acidizing; however, the excessive corrosion and reaction rates, especially under high-pressure/high-temperature (HPHT) conditions, often limit its applications.

Testing cores of Indiana limestone block were prepared and are tested by a coreflood setup. The core was first saturated using potassium chloride brine (KCl, 2 wt %) and then subject to an acid solution to determine optimal interaction profile between the acidizing agent and the target rock formation at elevated temperatures, as such that minimal quantity of acidizing agent is required to achieve the breakthrough to the rock core of certain dimension. This test illustrates that the composition obtains the highly desired reservoir conductivity without compromising its mechanic integrity. The brine, 2 wt % KCl, was used to saturate the core overnight and in the permeability measurements. Solutions were prepared by dilution with de-ionized water (resistivity 18.2 MΩ at 77° F.). 1 vol % corrosion inhibitor (Corrsorb 3600, Baker Hughes Inc.) was added to tests at 300° F.

The core was situated on a holder and the core and inlet lines providing the potassium chloride brine (KCl) and the acid solution to the core were temperature controlled, mounted in an oven to control the temperature. A pressure transducer was used to measure the pressure drop across the core, and the results were sent through a data acquisition system to a computer operating LabVIEW® software. A backpressure regulator was installed at the core outlet to maintain a backpressure of 1100 psi to ensure that the $CO_2$, produced as a result of the reaction with acid, is kept in solution. An overburden pressure of 1,800 psi was applied on the core to ensure that flow of different fluids did not bypass the core.

Core Preparation. Core samples with diameter 1.5 in. and length 6 in. were drilled from Indiana limestone block. The cores were dried in an oven at 150° F. for 12 hours followed by complete saturation with 2 wt % KCl under vacuum for 4 hours. The pore volume and porosity were calculated by the weight difference method. Firstly, the permeability of each of the cores were determined by injecting 2 wt % KCl brine at injection rates of 1, 3, and 5 $cm^3$/min at room temperature, using Darcy's equation. The porosities and permeability's of all the cores used are given in Table 2 below.

TABLE 2

| Core # | PV, $cm^3$ | Initial permeability, md | Temperature, ° F. | Flowrate $cm^3$/min |
|---|---|---|---|---|
| 1 | 25.72 | 11.2 | 250 | 1.0 |
| 2 | 24.85 | 6.1 | 250 | 0.5 |
| 3 | 25.31 | 8.8 | 250 | 2.5 |
| 4 | 25.03 | 7.8 | 250 | 5.0 |
| 5 | 24.71 | 9.4 | 300 | 1.0 |
| 6 | 24.02 | 10.4 | 300 | 10 |
| 7 | 25.73 | 9.4 | 300 | 7.5 |
| 8 | 26.17 | 11.7 | 300 | 5.0 |

Figure 2:
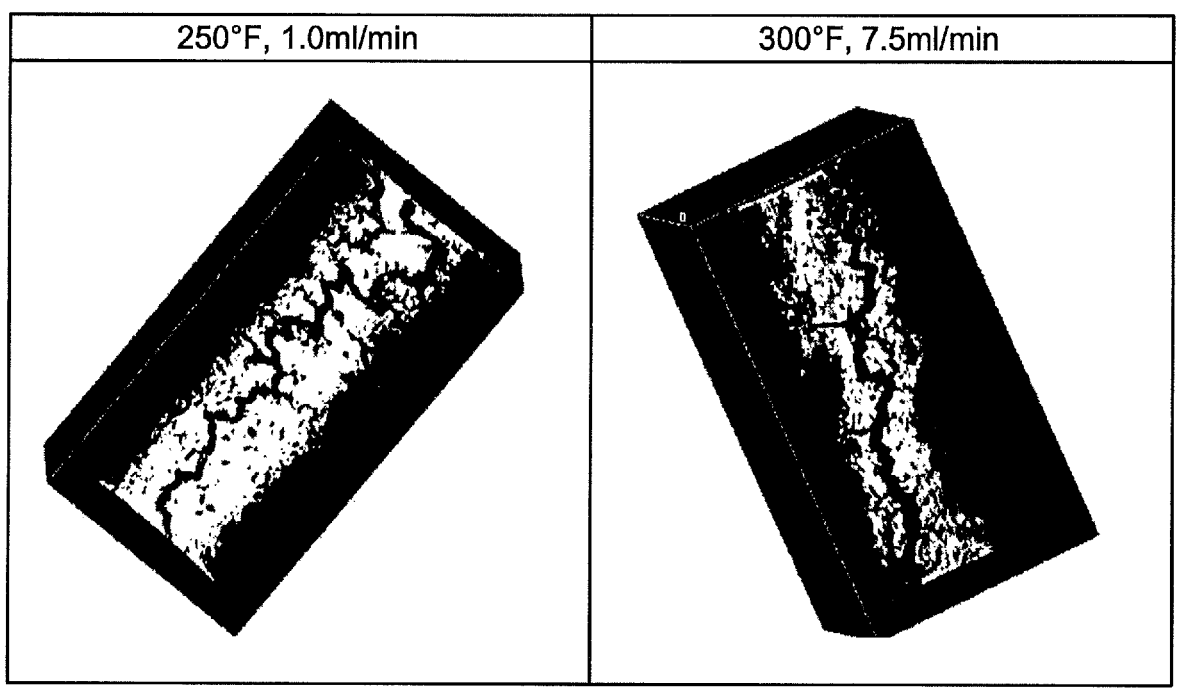
FIG. 2 are figures showing samples core's single-track breakthrough wormhole for sample cores conducted at the 250° F. and 300° F. experiments per Table 2.

As shown in FIG. 1, the optimal injection rate curves at 250° F. and 300° F. respectively show that the composition is capable of deploying significantly above the upper temperature limit of raw hydrochloric acid, typically around 200° F. In addition, the composition etches the formation reservoir in such an extremely effective way that it achieves the fluid breakthrough by using less than half of the pore volume of the rock. This superior performance is attributed to the fact that the composition is appropriately retarded to function in the challenging, yet highly desirable, temperature range in which it is not prematurely consumed. This unique advantage is further corroborated by 3-D computer tomographic scan images on cores tested in corresponding temperatures as shown in FIG. 2. The 3-D computer tomographic scan images indicates that the composition generates highly regulated reactive channels across the longitudinal axis of the core (wormhole), without either being overly consumed at near the entry point, as would have happened to raw mineral acid, or producing massive side channels, as would have happened to insufficiently retarded mineral acid. The monotonic trajectory of wormhole with fine diameter is on the most critical demand for high temperature acidizing treatment The composition disclosed in the invention is capable of generating highly effective wormhole network in carbonate formation rocks, resulting in enhanced reservoir productivity. This is achieved by chemically retard the mineral acid proton, so that it interacts with the target formation in a more controlled manner, and can be extended above the upper temperature limit of raw mineral acid agent.

While the foregoing is directed to embodiments of the present disclosure, other and further embodiments of the disclosure may be devised without departing from the basic scope thereof, and the scope thereof is determined by the claims that follow.

What is claimed is:

1. A composition, comprising:
   from 5.0 to 28 wt % of a mineral acid; and
   a retardation agent comprising:
     an amine-containing resin; and
     lignosulfonate; and
   a viscosity modifier, wherein the amine-containing resin, comprises from 0.01 to 5.0 wt % of the composition.

2. The composition of claim 1, wherein the composition further comprises water.

3. The composition of claim 1, wherein the mineral acid is selected from the group consisting of hydrochloric acid, nitric acid, phosphoric acid, sulfuric acid, hydrofluoric acid, hydrobromic acid, perchloric acid, hydroiodic acid, and combinations thereof.

4. The composition of claim 1, wherein the amine-containing resins are selected from the group consisting of urea-formaldehyde, urea-formaldehyde derivative, and combinations thereof.

5. The composition of claim 1, wherein the composition further comprises an additive selected from the group consisting of a corrosion inhibitor, an anti-sludge agent, a chelating agent, an hydrogen sulfide scavenger, and combinations thereof.

6. The composition of claim 1, wherein the lignosulfonate exerts a degree of sulfonation ranging from about 0.2 to about 5.0.

7. The composition of claim 1, wherein the lignosulfonate comprises one or more cations selected from the group consisting of ammonium cations, lithium cations, sodium cations, potassium cations, silver cations, calcium cations, magnesium cations, zinc cations, iron cations, copper cations, cobalt cations, manganese cations, nickel cations, titanium cations, aluminum cations, and combinations thereof.

8. The composition of claim 4, wherein the amine-containing resins are selected from the group consisting of urea-formaldehyde resin, melamine-formaldehyde resins, melamine-urea-formaldehyde resins, derivations thereof, and combinations thereof.

9. The composition of claim 1, wherein the mineral acid and retardation agent comprise a wt % ratio of mineral acid to retardation agent from 1:1 to 5:1.

10. The composition of claim 1, wherein the composition comprises:
    from 5.0 to 28 wt % hydrochloric acid;
    from 0.01 to 5.0 wt % sulfuric acid;
    from 0.01 to 5.0 wt % urea-formaldehyde, urea-formaldehyde derivative, or both;
    from 0.01 to 20 wt % lignosulfonate; and
    from 42 to 94.97 wt % water, wherein the amount of the components totals 100 wt. %.

11. The composition of claim 5, wherein the composition comprises:
    from about 0.01 to about 5.0 wt % of the additive selected from the group consisting of a corrosion inhibitor, an anti-sludge agent, a chelating agent, a hydrogen sulfide scavenger, and combinations thereof.

12. The composition of claim 5, wherein the composition comprises:
    from about 5.0 to about 28 wt % hydrochloric acid;
    from about 0.01 to about 5.0 wt % sulfuric acid;
    from about 0.01 to about 5.0 wt % urea-formaldehyde, urea-formaldehyde derivative, or both;
    from about 0.01 to about 20 wt % lignosulfonate;
    from about 0.01 to about 5.0 wt % viscosity modifier, a corrosion inhibitor, an anti-sludge agent, a chelating agent, a hydrogen sulfide scavenger, and combinations thereof; and
    from about 37 to about 94.96 wt % water, wherein the amount of the components totals 100 wt. %.

13. The composition of claim 5, wherein the composition comprises:
    from 5.0 to 28 wt % hydrochloric acid;
    from 0.01 to 5.0 wt % urea-formaldehyde, urea-formaldehyde derivative, or both;
    from 0.01 to 20 wt % lignosulfonate;
    from 0.01 to 5.0 wt % viscosity modifier; and
    from 42 to 94.97 wt % water, wherein the amount of the components totals 100 wt. %.

14. The composition of claim 5, wherein a composition comprises:
    from 5.0 to 28 wt % hydrochloric acid;
    from 0.01 to 5.0 wt % sulfuric acid;
    from 0.01 to 20 wt % lignosulfonate;
    from 0.01 to 5.0 wt % viscosity modifier; and
    from 42 to 94.97 wt % water, wherein the amount of the components totals 100 wt. %.

15. The composition of claim 1, wherein the retardation agent and the mineral acid comprise a molar ratio from about 0.1 to about 2.0.

16. A process for using a composition, comprising:
    providing the composition of claim 1; and
    depositing the composition downhole of a wellbore.

17. The process of claim 16, wherein the composition comprises solid powders.

18. The process of claim 16, wherein the composition comprises aqueous slurries.

19. The process of claim 16, wherein the composition is pre-blended with concentrated mineral acid in an acid tank, a transportation vessel, a downhole flowline, or a combination thereof.

20. A process for using a composition, comprising:
    providing the composition of claim 1; and
    blending into an acidizing treatment fluid for the purpose of metal pickling.

* * * * *